United States Patent
Malkamäki et al.

(10) Patent No.: US 9,386,625 B2
(45) Date of Patent: Jul. 5, 2016

(54) UPDATE OF TIMING ADVANCE WITHOUT STARTING DISCONTINUOUS RECEPTION ACTIVITY TIMER

(71) Applicant: NOKIA CORPORATION, Espoo (FI)

(72) Inventors: Esa Malkamäki, Espoo (FI); Elena Virtej, Espoo (FI); Juha S. Korhonen, Espoo (FI); Petteri Lunden, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 99 days.

(21) Appl. No.: 13/839,108

(22) Filed: Mar. 15, 2013

(65) Prior Publication Data

US 2013/0242953 A1    Sep. 19, 2013

Related U.S. Application Data

(60) Provisional application No. 61/611,745, filed on Mar. 16, 2012.

(51) Int. Cl.
*H04W 76/04* (2009.01)
*H04W 56/00* (2009.01)
*H04W 74/08* (2009.01)

(52) U.S. Cl.
CPC ........ *H04W 76/048* (2013.01); *H04W 56/0045* (2013.01); *H04W 74/08* (2013.01); *Y02B 60/50* (2013.01)

(58) Field of Classification Search
None
See application file for complete search history.

(56) References Cited

U.S. PATENT DOCUMENTS

| 2009/0238105 | A1 | 9/2009 | Wu et al. | |
| 2009/0285141 | A1* | 11/2009 | Cai et al. | 370/311 |
| 2009/0316593 | A1 | 12/2009 | Wang et al. | |
| 2014/0161111 | A1* | 6/2014 | Kim et al. | 370/336 |

FOREIGN PATENT DOCUMENTS

| EP | 2 086 124 A2 | 8/2009 |
| EP | 2 182 767 A2 | 5/2010 |
| EP | 2 744 132 A2 | 6/2014 |
| WO | 2009/117634 A1 | 9/2009 |
| WO | 2009132329 A2 | 10/2009 |
| WO | 2009/154412 A2 | 12/2009 |

OTHER PUBLICATIONS

The 3rd Generation Partnership Project, Technical Specification Group Radio Access Network, Evolved Universal Terrestrial Radio Access (E-UTRA), Medium Access Control (MAC) protocol specification (Release 10), 3GPP TS 36.321, V10.40 (Dec. 2011).*

"The 3rd Generation Partnership Project, Technical Specification Group Radio Access Network, Evolved Universal Terrestrial Radio Access (E-UTRA), Medium Access Control (MAC) protocol specification (Release 10)", 3GPP TS 36.321, V10.40 (Dec. 2011).*

(Continued)

*Primary Examiner* — Charles C Jiang
*Assistant Examiner* — George Atkins, Jr.
(74) *Attorney, Agent, or Firm* — Squire Patton Boggs (US) LLP

(57) ABSTRACT

Methods, apparatuses, and computer programs that are able to minimize UE power consumption while still updating the TA are provided. For example, one embodiment includes performing TA update without starting the DRX inactivity timer and short cycle timer.

3 Claims, 5 Drawing Sheets

(56) References Cited

OTHER PUBLICATIONS

3GPP TS 36.321 V10.4.0 (Dec. 2011) 3rd Generation Partnership Project; Technical Specification Group Radio Access Network; Evolved Universal Terrestrial Radio Access (E-UTRA); Medium Access Control (MAC) protocol specification (Release10). Section 5.7.

International Search Report for PCT/FI2013/050234, dated Jun. 4, 2013.

European Patent Office, Partial Supplemental European Search Report for corresponding EP Patent Appln. No. 13761135.6, Oct. 28, 2015.

Sunplus Mmobile Inc., "Align the DRX Active Time with RA procedure," R2-083428, 3GPP TSG-RAN WG2 Meeting #62bis, Jun. 30-Jul. 4, 2008, pp. 1-7, Warsaw, Poland.

European Patent Office, Extended Search Report for corresponding Patent Application No. 13761135.6, Feb. 3, 2016.

* cited by examiner

UPDATE OF TIMING ADVANCE WITHOUT STARTING DISCONTINUOUS RECEPTION ACTIVITY TIMER

CROSS REFERENCE TO RELATED APPLICATIONS

This application claims priority from U.S. provisional application No. 61/611,745, filed on Mar. 16, 2012. The entire contents of this earlier filed application are hereby incorporated by reference.

BACKGROUND

1. Field

Embodiments of the invention relate to wireless communications networks, such as the Universal Mobile Telecommunications System (UMTS) Terrestrial Radio Access Network (UTRAN) Long Term Evolution (LTE) and Evolved UTRAN (E-UTRAN).

2. Description of the Related Art

Universal Mobile Telecommunications System (UMTS) Terrestrial Radio Access Network (UTRAN) refers to a communications network including base stations, or Node Bs (or enhanced Node Bs (eNBs) in LTE or E-UTRAN), and radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE is also expected to improve spectral efficiency in 3G networks, allowing carriers to provide more data and voice services over a given bandwidth. Therefore, LTE is designed to fulfill future needs for high-speed data and media transport in addition to high-capacity voice support. Advantages of LTE include high throughput, low latency, FDD and TDD support in the same platform, an improved end-user experience, and a simple architecture resulting in low operating costs. Further information on the LTE features may be found in TS 36.300 v. 11.1.0 (LTE Stage 2), which is incorporated by reference in its entirety.

LTE transmissions on the physical uplink (UL) control and shared channels (PUCCH and PUSCH) are time aligned to preserve orthogonality of PUSCH demodulation reference and PUCCH signals of the different UEs in the OFDMA system. When the proper UL timing is unknown either because UE is making initial access or there has not been UL transmissions for a long time, the random access procedure is used for setting the UL timing. Then UE transmits a preamble on the random access channel (RACH), the preamble timing being aligned with the received DL timing. As a response to the preamble, UE receives a timing advance (TA) command that indicates how much earlier the UL transmissions must be started relative to the received DL signal. After the random access procedure UE may receive TA updates that correct small timing drifts due to UE movement or radio channel changes. The validity of UE's TA value is controlled with a time alignment timer (TAT). UE resets its TAT when it receives the initial or updating TA command, and if the TAT expires, UE considers its UL unsynchronized.

SUMMARY

One embodiment is directed to a method. The method includes receiving, at a user equipment, a physical downlink control channel (PDCCH) order from an eNB. The method may further include sending a random access (RA) preamble to the eNB, and receiving a random access response (RAR) comprising the timing advance (TA) from the eNB. The receiving of the RAR does not place the UE into active time.

Another embodiment is directed to a method. The method includes receiving, at a user equipment, a timing advance (TA) command medium access control (MAC) control element (CE) from an eNB. The receiving of the TA command MAC CE alone does not start the inactivity timer.

Another embodiment is directed to a method. The method includes receiving, from an evolved node B (eNB), a new command medium access control (MAC) control element (CE). The new command MAC CE configured to stop the inactivity timer, the onDuration timer but not start the short cycle timer.

Another embodiment is directed to an apparatus including at least one processor and at least one memory including computer program code. The at least one memory and the computer program code configured, with the at least one processor, to cause the apparatus at least to receive a physical downlink control channel (PDCCH) order from an eNB, send a random access (RA) preamble to the eNB, and receive a random access response (RAR) comprising the timing advance (TA) from the eNB. The receiving of the RAR does not place the UE into active time.

Another embodiment is directed to an apparatus including at least one processor and at least one memory including computer program code. The at least one memory and the computer program code configured, with the at least one processor, to cause the apparatus at least to receive a timing advance (TA) command medium access control (MAC) control element (CE) from an eNB. The receiving of the TA command MAC CE alone does not start the inactivity timer.

Another embodiment is directed to an apparatus including at least one processor and at least one memory including computer program code. The at least one memory and the computer program code configured, with the at least one processor, to cause the apparatus at least to receive, from an evolved node B (eNB), a new command medium access control (MAC) control element (CE) configured to stop the inactivity timer, the onDuration timer, but not start the short cycle timer.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of a system, a method, an apparatus, and a computer program product for timing advance (TA) update, as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Embodiments of the invention may relate generally to E-UTRAN and, in some embodiments, relate to E-UTRAN UE power consumption, UE scheduling and physical downlink control channel (PDCCH) monitoring. For UEs, such as smart phones, that have background traffic of the type that is always on, the UE power consumption is sought to be minimized. Therefore, any unnecessary traffic should be avoided, especially because any new uplink (UL) or downlink (DL) transmission on PUSCH/PDSCH starts a discontinuous reception (DRX) inactivity timer.

The UE may have a time alignment timer (TAT) running. This TAT is linked to the uplink timing advance life time. The TAT may be started or reset every time the UE receives a timing advance (TA) value from the eNB. The UE may also be configured with various uplink resources, such as periodic channel quality indicator (CQI), sounding reference symbol (SRS), scheduling request (SR), etc. These allocations may only be valid as long as the UE has a valid TAT. When the TAT expires, the UE will release these resources and will need to be reconfigured with a new resource by the RRC.

Figure 1:
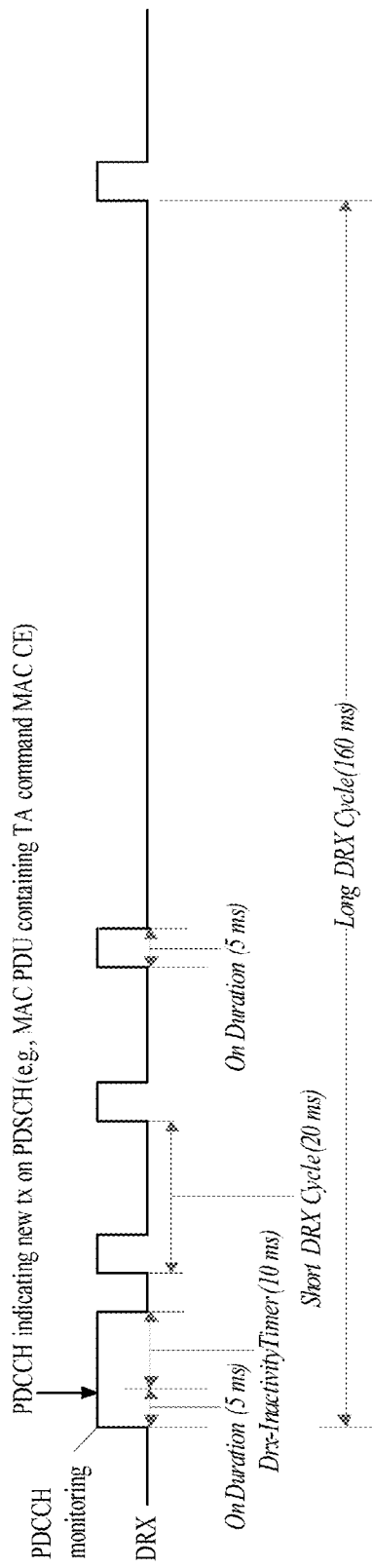
FIG. 1 illustrates a DRX cycle according to one embodiment.

When the TA is kept updated and, therefore, the time alignment timer TAT is running, TA commands need to be continuously sent to the UE. Every time a TA command MAC control element is sent to the UE on PDSCH, the UE starts the DRX inactivity timer and, when the DRX inactivity timer expires, a short cycle timer is started. FIG. 1 illustrates an example of what occurs when TA command medium access control (MAC) control element (CE) is received on PDSCH. As shown in FIG. 1, the DRX inactivity timer is started and when it expires, the UE enters short DRX cycle (e.g., for 3 short cycles). This extra monitoring of the PDCCH causes extra power consumption. Furthermore, the UE may send a message in the UL (e.g., CSI/CQI) so that the eNB can measure the UL timing. These UL transmissions also cause extra power consumption.

Some solutions seek to minimize the UE power consumption by setting the TAT to infinity, so that the TAT never expires. Such a solution may be feasible for small cells where the TA is not needed or for stationary UEs. Typically, however, this solution cannot be used since UEs are moving and the serving cell is not usually that small.

An alternative solution is to let the TAT expire. When the TAT expires, the UE releases PUCCH and SRS resources. This is a powerful way of reducing power consumption from the UE point of view since it stops all UE UL transmissions (except random access). However, the UE also then releases all dedicated scheduling request (SR) PUCCH resources. As a result, the UE has to perform random access when it wants to send a SR or when there is DL data being sent to the UE (in this case, the eNB first sends a PDCCH order to request the UE to start random access). Thus, by letting the TAT expire, the eNB will increase the load on RACH, which is also not a desirable result (RACH is normally used for initial access at the beginning of the connection as well as for handover).

In view of the above, embodiments of the invention provide a method, apparatus, and computer program that are able to minimize UE power consumption while still updating the TA. For example, one embodiment includes performing TA update without starting the DRX inactivity timer and short cycle timer.

Figure 2:
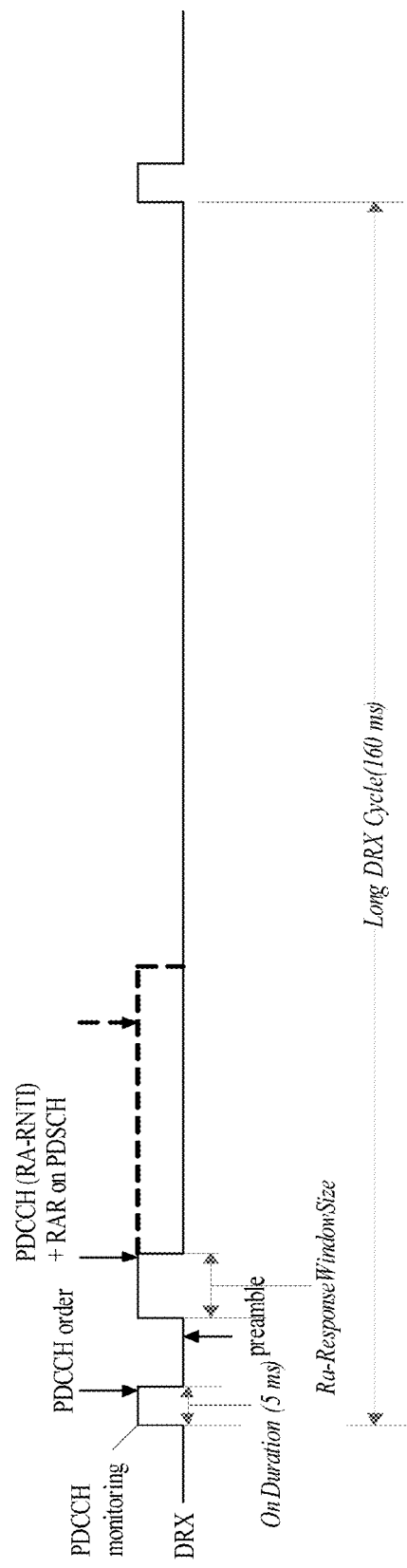
FIG. 2 illustrates a DRX cycle according to another embodiment.

As illustrated in FIG. 2, previously the UE stays in active time until it gets PDCCH indicating a new transmission (shown with dashed line in FIG. 2). In particular, FIG. 2 shows a TA update with PDCCH order where, after sending the random access preamble, the UE monitors the PDCCH during Ra-ResponseWindowSize. In the example of FIG. 2, when the random access response (RAR) is received, the UE stays in active time. According to one embodiment of the present invention, however, the UE does not enter Active Time if TAT is running.

More specifically, instead of sending TA MAC CE on PDSCH, the eNB sends a PDCCH order to the UE even when the TAT is running, which does not start the DRX inactivity timer. The UE sends a RA preamble to the eNB. The eNB may then send, to the UE, a random access response (RAR) that gives the TA, and the reception of the RAR in this case does not place the UE into active time. This could be implemented into LTE MAC specification (TS 36.321 v. 10.4.0), Section 5.7, for instance, in the following way:

When a DRX cycle is configured, the Active Time includes the time while:
onDurationTimer or drx-Inactivity Timer or drx-Retransmission Timer or mac-ContentionResolutionTimer (as described in subclause 5.1.5) is running; or
a Scheduling Request is sent on PUCCH and is pending (as described in subclause 5.4.4); or
an uplink grant for a pending HARQ retransmission can occur and there is data in the corresponding HARQ buffer; or
a PDCCH indicating a new transmission addressed to the C-RNTI of the UE has not been received after successful reception of a Random Access Response for the preamble not selected by the UE when time alignment timer is not running (as described in subclause 5.1.4).

In an embodiment, the RAR should give zero UL grant to avoid transmission of an empty buffer status report (BSR) (currently minimum UL grant is 1 PRB and minimum TB size is 16 bits which can accommodate a short or truncated BSR). In one example, a codeword may be reserved, for example from the fixed sized resource block assignment (10 bits). Alternatively, the LTE random access procedure could be modified such that the UL grant is not indicated to the lower layers. This could be implemented into LTE MAC specification (TS 36.321 v. 10.4.0), Section 5.1.4, for instance, in the following way:

if the Random Access Response contains a Random Access Preamble identifier corresponding to the transmitted Random Access Preamble (see subclause 5.1.3), the UE shall:
consider this Random Access Response reception successful;
process the received Timing Advance Command (see subclause 5.2);
indicate the preambleInitialReceivedTargetPower and the amount of power ramping applied to the latest preamble transmission to lower layers (i.e., (PREAMBLE_TRANSMISSION_COUNTER−1)*powerRampingStep);

if the Random Access Preamble was selected by UE MAC; or if the Random Access Preamble was not selected by UE MAC and time alignment timer is not running:

process the received UL grant value and indicate it to the lower Layers . . . .

Figure 3:
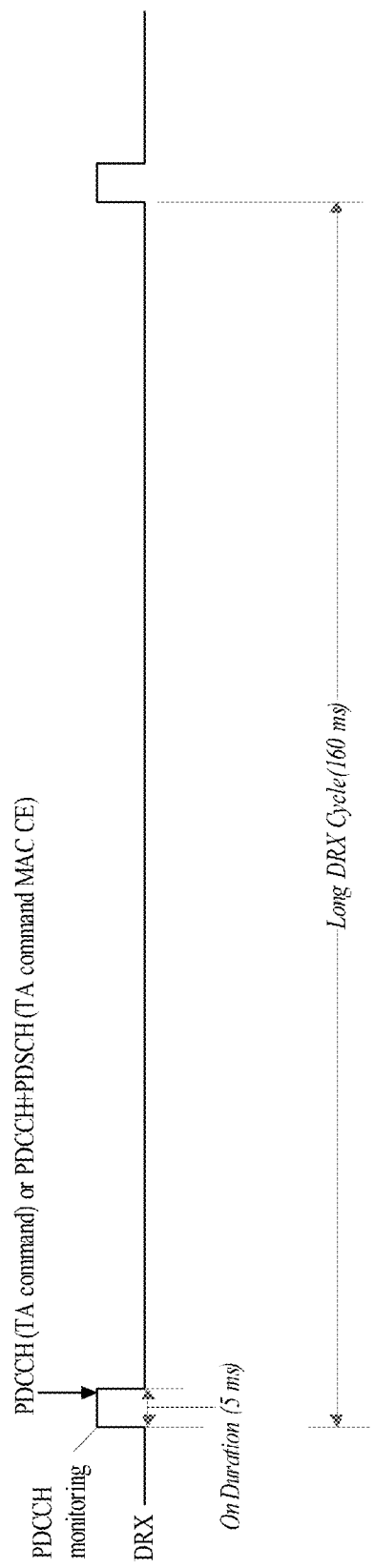
FIG. 3 illustrates a DRX cycle according to another embodiment.

In one embodiment, the eNB may be configured to send the TA command MAC CE alone on PDSCH. The UE may be configured to send the normal HARQ ACK/NACK (with old TA, since ACK/NACK is sent in subframe n+4 for PDSCH sent in subframe n and TA value is update in subframe n+6). Thus, eNB can check whether the sent TA value was correct, i.e., whether the timing advance used for the HARQ ACK was as assumed by eNB when calculating the new TA. According to an embodiment, the TA command MAC CE sent alone does not start inactivity timer. FIG. 3 illustrates an example of a TA update according to the embodiment. Thus, the eNB sending the TA command MAC CE only on PDSCH does not start the inactivity timer. Alternatively, in one embodiment, a MAC PDU containing only MAC control elements (CE) does not start the inactivity timer.

Figure 4:
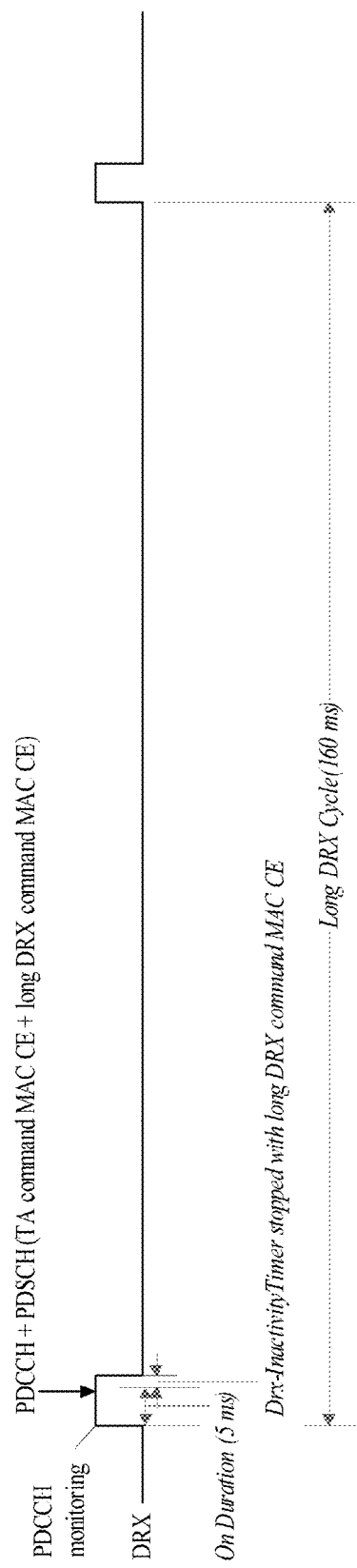
FIG. 4 illustrates a DRX cycle according to another embodiment.

Alternatively, the eNB can send a TA command MAC CE and DRX command MAC CE in a MAC PDU on PDSCH. The DRX command MAC CE will stop the inactivity timer but it will also start the short cycle timer which is not desirable in this case since it causes extra power consumption. In an embodiment, the eNB may send the TA command MAC CE and a new "long DRX command" MAC CE which pushes UE directly into a long DRX cycle. FIG. 4 illustrates the application of the new "long DRX command" MAC CE which pushes the UE directly into long DRX, according to one embodiment. In this embodiment, the inactivity timer may be started since PDCCH indicates a new transmission, but is stopped immediately when "long DRX command" MAC CE on PDSCH is decoded and processed. According to an embodiment, a new MAC CE may be specified which combines TA command and new DRX command to restart the TAT, adjust the TA and stop DRX active time. This could be implemented into LTE MAC specification (TS 36.321 v. 10.4.0), Section 5.7, for instance, in the following way:

When DRX is configured, the UE shall for each subframe:
- if a HARQ RTT Timer expires in this subframe and the data of the corresponding HARQ process was not successfully decoded:
    - start the drx-RetransmissionTimer for the corresponding HARQ process.
- if a DRX Command MAC control element or a "long DRX command MAC control element" is received:
    - stop onDurationTimer;
    - stop drx-InactivityTimer.
- if drx-InactivityTimer expires or a DRX Command MAC control element is received in this subframe:
    - if the Short DRX cycle is configured:
        - start or restart drxShortCycleTimer;
        - use the Short DRX Cycle.
    - else:
        - use the Long DRX cycle.
- if drxShortCycleTimer expires or a "long DRX command MAC control element" is received in this subframe:
    - use the Long DRX cycle.
    . . . . . . .

In some embodiments, for example as shown in FIG. 3, the eNB can send, to the UE, a TA command on PDCCH, which would not start inactivity timer since there is no new transmission indicated on PDCCH. In an embodiment, for example, a new PDCCH command can be defined. Since no PDSCH decoding is needed, TA could be applied already in subframe n+4 (instead of subframe n+6 currently defined for TA received in TA command). This new PDCCH command can be acknowledged by the UE in a hybrid automatic repeat request (HARQ) acknowledgement (ACK) (similar to SPS release). According to one embodiment, the eNB can check that TA is correct from the HARQ ACK sent with the new TA value.

An existing PDCCH format can be reused for the new PDCCH command if the existing formats contain an information field or combination of fields whose all bit combinations are not meaningful. Such unused bit combination can then be used to indicate a new purpose of the PDCCH. The benefit is that UE's PDCCH decoding load is not increased as would happen if a new PDCCH format would be tailored for the PDCCH command. A suitable format for sending PDCCH command is format 1A that has been designed for scheduling a PDSCH code word but which is also used for sending PDCCH order for initiating random access. In case of PDCCH order, the first information fields up to and including the resource assignment field are set to a combination that is not in use with normal resource assignments. The following ten bits carry the Preamble Index and the PRACH Resource Index. The rest of the bits are fixed to zero. This format may be made a part of a general format that can be used for carrying different PDCCH commands: The first information fields up to the resource assignment field may be fixed as in case of PDCCH order and the last e.g. three bits may indicate the type of the command. In case of starting random access, these command type bits may all be set to zero. One of the other seven combinations of the command type bits may indicate that PDCCH carries TA command which may be read, e.g., from the bits following the field normally indicating the resource assignment. This definition allows adding to the specification flexibly different kind of commands as needed in the future. It also incorporates the existing definition of PDCCH order, which simplifies implementation.

Figure 5:
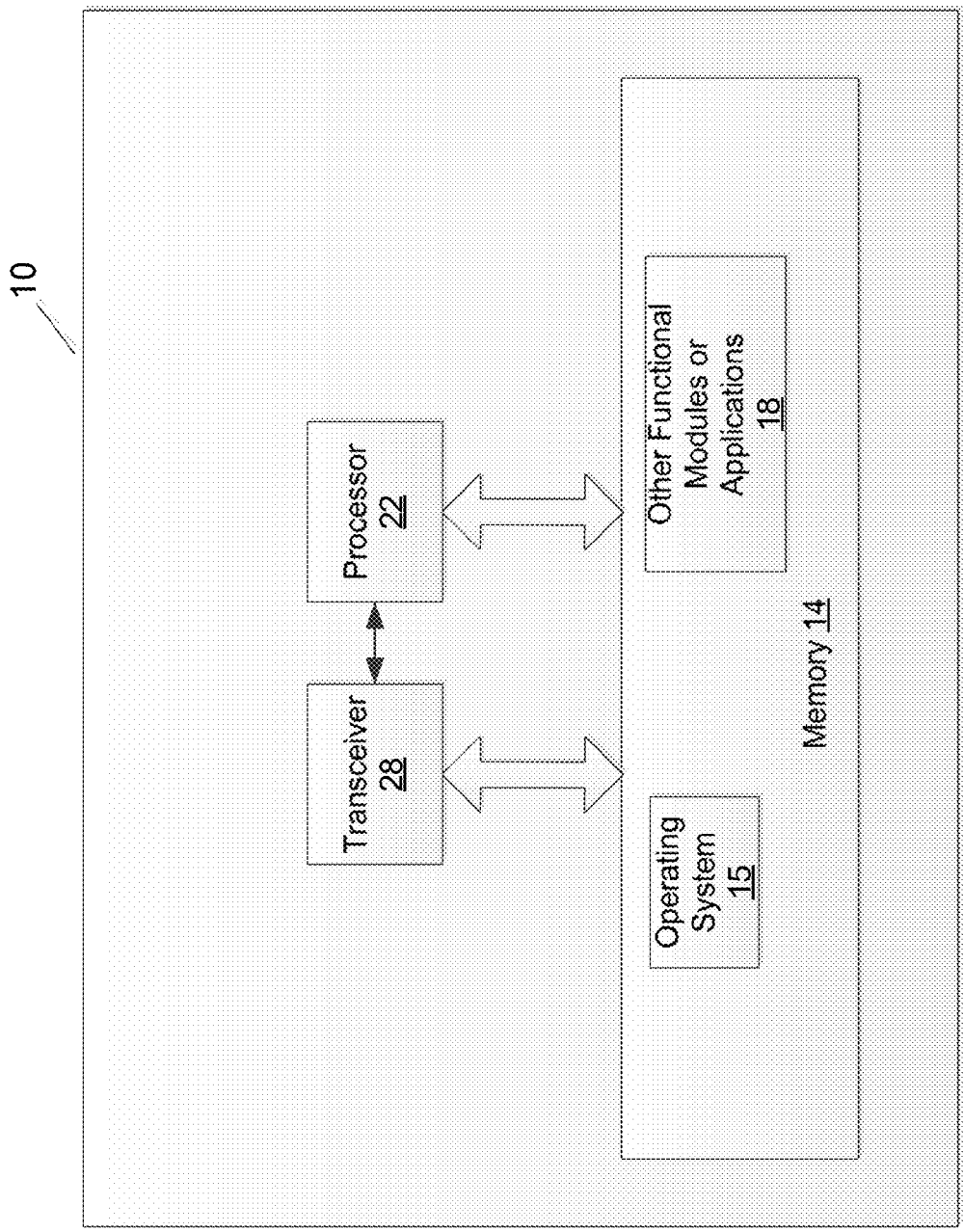
FIG. 5 illustrates an apparatus according to one embodiment.

FIG. 5 illustrates an apparatus 10 according to one embodiment. In an embodiment, apparatus 10 may be a UE configured to update the TA without starting the DRX inactivity timer thereby minimizing power consumption. Apparatus 10 includes a processor 22 for processing information and executing instructions or operations. Processor 22 may be any type of general or specific purpose processor. While a single processor 22 is shown in FIG. 5, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

According to one embodiment, apparatus 10 may be configured to receive a PDCCH order from the eNB. The PDCCH order may be sent by the eNB even when the TAT is running, which does not start the DRX inactivity timer. Apparatus 10 may then be configured to send a RA preamble to the eNB, and receive a RAR including the TA from the eNB. In an embodiment, the reception of the RAR does not place apparatus 10 into active time. According to one embodiment, the RAR gives zero UL grant to avoid transmission of an empty BSR.

According to another embodiment, apparatus 10 may be configured to receive a TA command MAC CE from the eNB. Apparatus 10 may then be configured to send a HARQ ACK/NACK with old TA to the eNB. In one embodiment, apparatus 10 can be configured such that reception of the TA command MAC CE alone does not start the inactivity timer, as shown in FIG. 3. In another embodiment, apparatus 10 can be configured such that reception of a MAC PDU containing only MAC CEs does not start the inactivity timer.

In another embodiment, apparatus 10 may be configured to receive, from the eNB, a TA command MAC CE and a new "long DRX command" MAC CE, which will stop the inactivity timer and will not start the short cycle timer. According to one example, the new DRX command MAC CE may be a "long DRX command" MAC CE that pushes apparatus 10 directly to a long DRX cycle, as shown in FIG. 4. In another example, a new MAC CE may be included which combines the TA command and the new long DRX command to, for instance, restart the TAT, adjust the TA, and stop the active time.

In another embodiment, apparatus 10 may be configured to receive, from the eNB, a new DRX command MAC CE, which will stop the inactivity timer and will not start the short cycle timer. According to one example, the new DRX command MAC CE may be a "long DRX command" MAC CE that pushes apparatus 10 directly to a long DRX cycle. Therefore, the new DRX command can be applied without TA command if the eNB wants to push the UE directly to the long DRX cycle.

One embodiment includes a method for updating of TA without starting the DRX inactivity timer. The method may include receiving, at a UE, a PDCCH order from the eNB. The PDCCH order may be sent by the eNB even when the TAT is running, which does not start the DRX inactivity timer. The method may then include sending a RA preamble to the eNB, and receiving a RAR including the TA from the eNB. In an embodiment, the reception of the RAR does not place the UE into active time. According to one embodiment, the RAR gives zero UL grant to avoid transmission of an empty BSR.

Another embodiment provides an alternative or additional method for updating of TA without starting the DRX inactivity timer. The method includes receiving, at the UE, a TA command MAC CE from the eNB. The method may then include sending a HARQ ACK/NACK with old TA to the eNB. In one embodiment, the UE receiving the TA command MAC CE alone does not start the inactivity timer. In one embodiment, the method may include configuring the UE such that reception of a MAC PDU containing only MAC CEs does not start the inactivity timer.

Another method for updating of TA without starting the DRX inactivity timer includes the UE receiving, from the eNB, a TA command MAC CE and DRX command MAC CE, which will stop the inactivity timer but start the short cycle timer. In one embodiment, the DRX command MAC CE may be a new DRX command MAC CE that pushes the UE directly to a long DRX cycle. In another embodiment, the method may comprise including a new MAC CE that combines the TA command and the new DRX command to, for instance, restart the TAT, adjust the TA, and stop the active time.

In some embodiments, the functionality of any of the methods described herein may be implemented by software stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Thus, another embodiment of the invention may include a computer program embodied on a computer readable medium. The computer program is configured to control a processor to perform a process. The process may include receiving a PDCCH order from the eNB. The PDCCH order may be sent by the eNB even when the TAT is running, which does not start the DRX inactivity timer. The method may then include sending a RA preamble to the eNB, and receiving a RAR including the TA from the eNB. In an embodiment, the reception of the RAR does not place the UE into active time. According to one embodiment, the RAR gives zero UL grant to avoid transmission of an empty BSR.

In another embodiment, the process may be performed by the processor of a UE and may include receiving a TA command MAC CE from the eNB. The method may then include sending a HARQ ACK/NACK with old TA to the eNB. In one embodiment, the receiving of the TA command MAC CE alone does not start the inactivity timer. In one embodiment, the method may include configuring the UE such that reception of a MAC PDU containing only MAC CEs does not start the inactivity timer.

In another embodiment, the process may be performed by the processor of a UE and may include receiving, from the eNB, a TA command MAC CE and DRX command MAC CE, which will stop the inactivity timer but start the short cycle timer. In one embodiment, the DRX command MAC CE may be a new DRX command MAC CE that pushes the UE directly to a long DRX cycle. In another embodiment, the method may comprise including a new MAC CE that combines the TA command and the new DRX command to, for instance, restart the TAT, adjust the TA, and stop the active time.

The computer readable media mentioned above may be at least partially embodied by a transmission line, a compact disk, digital-video disk, a magnetic disk, holographic disk or tape, flash memory, magnetoresistive memory, integrated circuits, or any other digital processing apparatus memory device.

As a result of embodiments of the invention discussed above, the TA can be updated and TAT restarted with minimal UE activity resulting in the minimization of power consumption.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method for updating a timing advance without starting a discontinuous reception inactivity timer and a short cycle timer, comprising:
    receiving at a user equipment, from an evolved node B (eNB), a command medium access control (MAC) control element (CE), wherein the command MAC CE includes a discontinuous reception (DRX) command configured to stop an inactivity timer and an onDuration timer but not start the short cycle timer, and
    stopping the inactivity timer and the onDuration timer at the user equipment,
    wherein the command MAC CE combines into a single command the timing advance (TA) command and the DRX command, which pushes the user equipment directly to a long DRX cycle, to restart a time alignment timer (TAT), adjust the TA, and stop the active time.

2. An apparatus configured to update a timing advance without starting a discontinuous reception inactivity timer and a short cycle timer, comprising
    at least one processor; and
    at least one memory including computer program code,
    the at least one memory and the computer program code are configured, with the at least one processor, to cause the apparatus at least to
    receive at a user equipment, from an evolved node B (eNB), a command medium access control (MAC) control element (CE) including a discontinuous reception (DRX) command configured to stop an inactivity timer and an onDuration timer, but not start the short cycle timer,
    stop the inactivity timer and the onDuration timer at the user equipment,
    wherein the command MAC CE combines into a single command the timing advance (TA) command and the DRX command, which pushes the user equipment directly to a long DRX cycle, to restart a time alignment timer (TAT), adjust the TA, and stop the active time.

3. A computer program, embodied on a non-transitory computer readable medium, the computer program configured to control a processor to perform a process for updating a timing advance without starting a discontinuous reception inactivity timer and a short cycle timer, comprising:
    receiving at a user equipment, from an evolved node B (eNB), a command medium access control (MAC) control element (CE), the command MAC CE includes a discontinuous reception (DRX) command configured to stop an inactivity timer, an on Duration timer but not start the short cycle timer,
    stopping the inactivity timer and the on Duration timer at the user equipment,
    wherein the command MAC CE combines into a single command the timing advance (TA) command and the DRX command, which pushes the user equipment directly to a long DRX cycle, to restart a time alignment timer (TAT), adjust the TA, and stop the active time.

* * * * *